(12) United States Patent
Wagner et al.

(10) Patent No.: US 7,743,742 B2
(45) Date of Patent: Jun. 29, 2010

(54) CYLINDER HEAD COVER WITH OIL SEPARATOR

(75) Inventors: Jürgen Wagner, Asselfingen (DE); Armin Praska, Rimpar (DE); Dieter Grafl, Ulm (DE); Kai-Uwe Lemke, Ulm (DE)

(73) Assignee: Reinz-Dichtungs GmbH, Neu-Ulm (DE)

( * ) Notice: Subject to any disclaimer, the term of this patent is extended or adjusted under 35 U.S.C. 154(b) by 669 days.

(21) Appl. No.: 10/592,029

(22) PCT Filed: Mar. 8, 2005

(86) PCT No.: PCT/EP2005/002431

§ 371 (c)(1),
(2), (4) Date: Jun. 29, 2007

(87) PCT Pub. No.: WO2005/085606

PCT Pub. Date: Sep. 15, 2005

(65) Prior Publication Data

US 2007/0272176 A1    Nov. 29, 2007

Related U.S. Application Data

(60) Provisional application No. 60/593,019, filed on Jul. 30, 2004.

(30) Foreign Application Priority Data

Mar. 8, 2004  (DE) .................. 10 2004 011 176
Mar. 8, 2004  (DE) .................. 10 2004 011 177
Jul. 30, 2004 (DE) .................. 10 2004 037 157

(51) Int. Cl.
*F01M 13/00* (2006.01)
*F01M 9/10* (2006.01)
*F02B 25/06* (2006.01)

(52) U.S. Cl. .................. 123/41.86; 123/572; 123/573; 123/574; 123/90.8; 55/337; 55/423; 55/324

(58) Field of Classification Search ............ 123/184.22, 123/184.24, 184.47, 184.51, 184.53, 184.55, 123/184.56, 572–574, 41.86, 195 C; 55/324, 55/337, 400, 520, 385.3, DIG. 19
See application file for complete search history.

(56) References Cited

U.S. PATENT DOCUMENTS 1,255,642 A * 2/1918 Sparrow .................. 404/38

(Continued)

FOREIGN PATENT DOCUMENTS

DE    197 00 733 A1    7/1998

(Continued)

*Primary Examiner*—Michael Cuff
*Assistant Examiner*—Hung Q Nguyen
(74) *Attorney, Agent, or Firm*—Marshall & Melhorn, LLC (57) ABSTRACT

The present invention relates to a cylinder head cover for covering a cylinder head of a combustion engine. Such cylinder head covers often comprise an oil separator for separating oil and/or oil spray from the blow-by gas of combustion engines. With the present invention the oil separator is formed as a flow-through tube (10) through which the gas with the oil and/or oil spray to be separated flows. The flow-through tube (10) with its longitudinal axis (14) in the flow-through direction lies essentially in the plane of extension of the cylinder head cover (1). A worm-like segment is arranged in the flow-through tube (10), and its thread surfaces (21) form a spiral flow path (2). At the same time the cross section of the flow path lies between 1 mm2 and 800 mm2.

25 Claims, 6 Drawing Sheets

U.S. PATENT DOCUMENTS

| | | | |
|---|---|---|---|
| 2,936,043 A | | 5/1960 | Armstrong et al. |
| 3,641,745 A | | 2/1972 | Moore |
| 3,893,914 A | | 7/1975 | Bobo |
| 3,966,443 A | | 6/1976 | Okano et al. |
| 4,289,611 A | * | 9/1981 | Brockmann ............... 209/710 |
| 4,565,164 A | * | 1/1986 | Satoh et al. ............. 123/41.86 |
| 4,622,048 A | * | 11/1986 | Roberts et al. ............... 96/188 |
| 4,723,529 A | * | 2/1988 | Yokoi et al. ............... 123/573 |
| 4,957,517 A | * | 9/1990 | Linnert ..................... 96/384 |
| 4,966,703 A | | 10/1990 | Kalnins et al. |
| 5,617,834 A | * | 4/1997 | Lohr ..................... 123/572 |
| 6,530,367 B2 | * | 3/2003 | Akiwa et al. ............. 123/572 |
| 6,648,939 B2 | * | 11/2003 | Neuschwander et al. ...... 55/423 |
| 6,860,915 B2 | | 3/2005 | Stegmaier et al. |
| 7,004,987 B2 | * | 2/2006 | Pikesh et al. ............... 55/347 |
| 2003/0024512 A1 | * | 2/2003 | Kitano et al. ............... 123/572 |

FOREIGN PATENT DOCUMENTS

| | | |
|---|---|---|
| DE | 199 51 312 A1 | 5/2001 |
| DE | 10 127 820 A1 | 12/2002 |
| DE | 10 2004 011 176 A1 | 10/2005 |
| DE | 10 2004 011 177 A1 | 10/2005 |
| EP | 0 730 086 B1 | 4/1998 |
| GB | 1 255 642 A | 12/1971 |
| JP | 08-284634 A | 10/1996 |

* cited by examiner

CYLINDER HEAD COVER WITH OIL SEPARATOR

FIELD OF THE INVENTION

The present invention relates to a cylinder head cover with an integrated oil separator for separating oil and/or oil spray from the blow-by gases of a combustion engine.

BACKGROUND

Tubular separators are know from the state of the art, for separating solid particles from air, in particular for dedusting, which comprise a flow-through tube in which a spiral is arranged. This spiral sets the air flowing through into a rotational movement about the middle axis of the spiral and thus leads to a separation of the particles on account of the centrifugal forces.

A cylinder head cover (also called valve cover) is known from DE 101 27 620 A1, with which the blow-by gases (also called crank housing gases or blow-through gases) are introduced from the crank housing of a combustion engine into a cylinder head cover and here are purified of oil or oil spray.

For this, firstly for coarse separation a spiral is arranged perpendicular to the plane of extension of the cylinder head cover in this. The blow-by gas flows through this spiral with a diameter of approx. 5 cm so that here large oil droplets are separated. An adequate separation is not achieved so that a further fine separation device is arranged subsequently.

BRIEF SUMMARY

It is therefore the object of the present invention to provide a cylinder head cover with which, in a simple and efficient manner, oil and oil spray may be removed from crank housing gases or from blow-by gases.

This object is achieved by the cylinder head cover according to claim 1. Advantageous further formations of the valve cover (=valve bonnet) according to the invention are specified in the dependent claims.

According to the invention, a flow-through tube as a tubular separator is arranged in the cylinder head cover in the horizontal or essentially in the horizontal position, at least not in the perpendicular position, through which the blow-by gases are led. A spiral or a worm-like segment is arranged in the flow-through tube, which sets the gases into a rotational movement about the middle axis of the worm-like segment. Oil and oil spray is separated by way of this. The spirals or worm-like segments at the same time are stationary and are not arranged in the flow-through tube in a rotatable manner. They therefore have no drive of their own, but act exclusively as passive, stationary deflection elements. It is therefore the case with the present tubular separators of purely passive separators in contrast to separators with rotatable impeller-like means for accelerating the fluid to be cleaned.

As is usual in the technical language, a worm is defined as a helical or also spiral thread led around a middle axis.

The purified gas as well as the separated oil is discharged through the same outlet of each flow-through tube.

At the same time however it is decisive that the flow-through tube comprises one or more flow paths (flights), wherein each of the flights has a cross section only of between 1 mm$^2$ and 800 mm$^2$. Thus it becomes possible for the first time, by way of the almost horizontal installation and corresponding dimensioning of the flow-through tube, to provide an extremely flatly constructed valve cover which in particular with the restricted installation conditions may be used in the motor spaces of modern vehicles. The present cylinder head cover is to be particularly distinguished from the solution according to DE 101 27 820 A1 with which the constructional height of the cylinder head cover is more than 5 cm and at the same time achieves only a poor degree of separation.

Then at least one first, preferably a first and a second worm-like segment are located in the flow-through tube. With this, a worm as is usual in technical language is indicated as a thread which is guided about a middle axis in a helical or also spiral manner. The surfaces of the thread at the same time together with the inner wall of the flow-through tube limit flow paths for the gas. In a corresponding manner then the gases, by way of the stationary thread surfaces (=screw surfaces), are set into a rotational movement about the mentioned middle axis (axial direction) so that the oil or oil spray due to the centrifugal forces settles on the inner wall of the flow-through tube.

It has now been ascertained as being advantageous that with a worm-like element or with a serial arrangement of at least two of such worm-like segments, which advantageously only have a length between 0.5 times and 3 times, preferably 2.5 times their pitch, one may achieve a very efficient separation. The pitch of the spiral at the same time corresponds to that axial length of a worm-like segment which this would have if its thread surfaces were to revolve (orbit) once completely around the middle axis of the segment by 360°.

The separation may advantageously be carried out in an extremely efficient manner if the rotational direction of the two worm-like segments is in opposite directions to one another so that the gas needs to be deflected from the one rotational direction into the other rotational direction within the flow-through tube.

By way of these spirals (worm-like segments) which are applied in the flow-through tube behind one another with opposite rotational directions, impingement surfaces arise at which the oil or oil spray is separated in an excellent manner. The thread surfaces of the worm-like segments may at the same time be arranged such that the thread surface of the subsequent segment projects into the flow path formed by a thread surface of the previous segment. Advantageously then at the beginning of the thread surface of the subsequent segment, an edge or flange directed counter to the gas flow is arranged on this segment so that separated oil flows away via the thread surface of the subsequent segment instead of being entrained again back into the gas flow over the free edge of the thread surface of the subsequent segment due to the flow of gas or any eddies.

If the flow-through tubes have diameters $\leq 30$ mm, then these may advantageously be installed into flat valve covers.

Advantageously each flow-through tube not only contains one flow path (flight), but also is divided perpendicularly to the longitudinal axis in a manner such that two or more flights which are separate from one another arise. For this, thread surfaces which are interweaved within one another are required.

The flow may enter into the flow-through tube axially and/or tangentially, or exit from this axially and/or tangentially. An entry and exit at a limited angle with respect to the axial direction and/or tangential direction is likewise possible.

The tubes may furthermore be widened at the beginning and/or at their end in order to minimise the pressure loss in the flow-through tube. A widening at the end of a flow-through tube reduces further the gas speed so that no droplet shear and thus atomisation of the already separated oil is effected at possible edges of the thread surfaces at the end of the last segment.

The core (the heart) of the worm-like segment may further be removed in the inlet and/or in the outlet region. By way of this a further reduction of the flow pressure losses is effected. A cone-like removal of the core is particularly favourable so that a free flow region is present in the middle axis of the segment.

One or more spirals and/or the flow tube may be reduced with respect to their diameter in the flow direction.

In order to lead away the oil separated on the wall of the flow-through tube, the wall advantageously in the axial direction, may comprise grooves or channels. It is also possible in the axial direction to attach webs for leading the separated oil to the outlet of the flow-through tube. The thread sure may also comprise grooves and/or channels which lead away the separated oil. Advantageously these then run in the flow direction of the gas or in the direction of the greatest pitch of the thread surfaces. It is particularly advantageous if the grooves run in the outer edges of the thread surfaces.

BRIEF DESCRIPTION OF THE DRAWINGS

A few examples of the present invention are described in the following.

There are shown in.

DETAILED DESCRIPTION OF THE INVENTION

Here, as in the following, the same or similar reference numerals are given to the same or similar elements, so that their description to some extent is not repeated.

Figure 1:
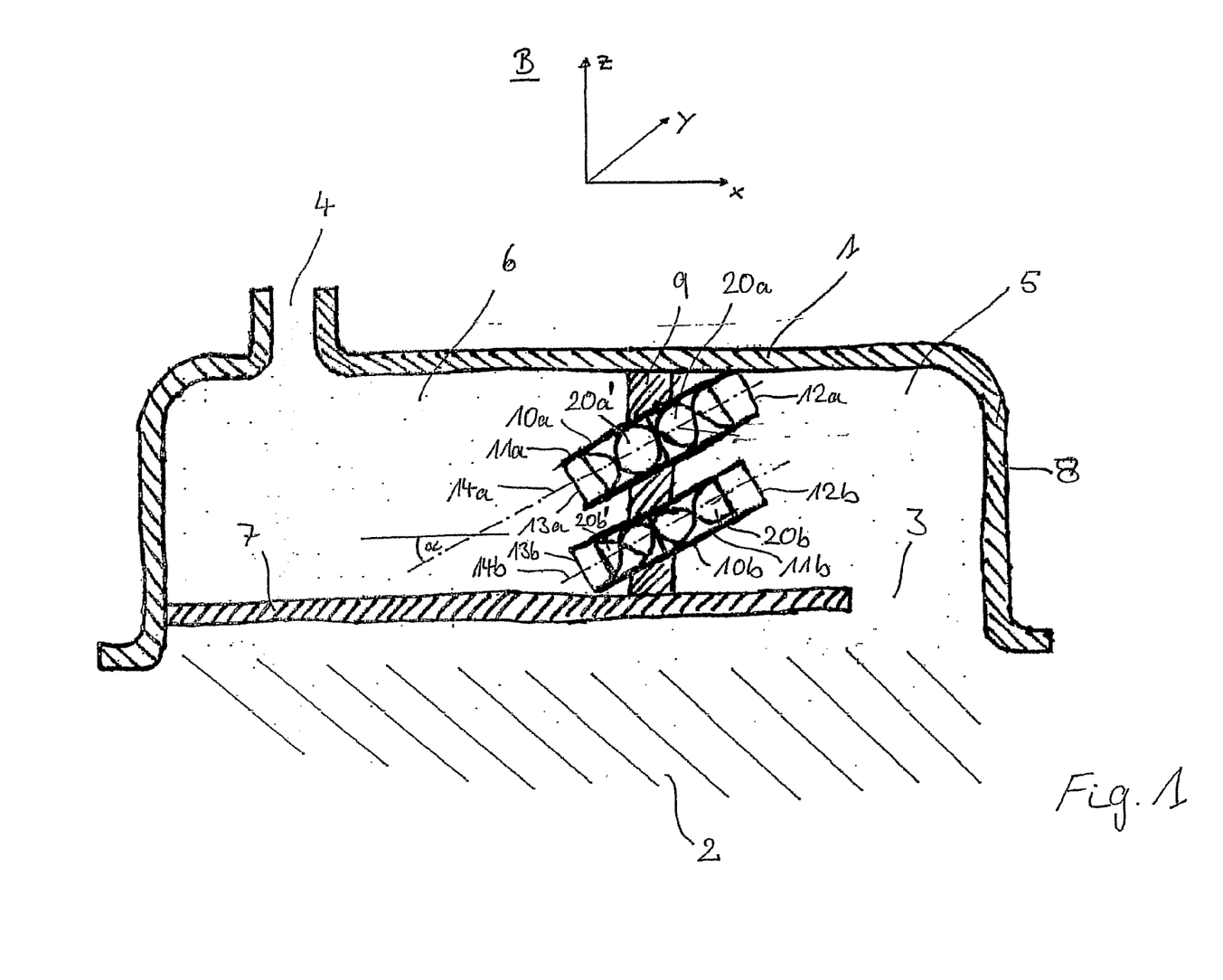
FIG. 1 a valve cover according to the invention (cylinder head cover)

FIG. 1 shows a cylinder head cover 1 according to the invention which is attached onto a cylinder head 2 of a combustion engine. Such a combustion engine produces so-called blow-by gases which are led away from the crank housing (crank case) and are led back into the intake line of the combustion engine. These crank housing gases contain finely distributed oil or oil spray which must be separated from the gas before leading back into the intake line of the combustion engine.

The valve cover according to the invention which contains the tubular separator comprises a housing lower part 7 which extends over the cylinder head 2 of the combustion engine and defines a plane which extends in the longitudinal and transverse direction of the cylinder head cover 1. The housing lower part 7 with a housing upper part 8 encloses a chamber which is subdivided by an intermediate wall 9, into two parts, specifically an inlet chamber 5 and calming chamber 6 (oil tank). In the intermediate wall 9 two flow-through tubes 10a, 10b extend from one side to the other, which are installed inclined at an angle α to the previously mentioned plane. These flow-through tubes comprise inlets 12a, 12b and outlets 13a, 13b for the crank housing gases. Within the cylinder head cover the flow-through tubes 10a, 10b represent the only (single) passage between the inlet chamber 5 and the calming chamber 6.

The housing of the cylinder head cover 1 comprises a gas inlet 3 for the crank housing gases which may flow into the inlet chamber 5. In this, they are still charged with oil and oil spray. Furthermore the housing of the cylinder head cover 1 comprises an outlet 4 out of the calming chamber 6 via which the crank housing gases purified of oil or oil spray may be led to the intake line of the combustion engine.

Two worm-like segments 20a, 20a' and 20b, 20b' are located in the flow-through tubes 10a, 10b after one another and arranged at a certain distance to the inlet 12a and 12b respectively. At the same time the worm-like elements 20a and 20a' or 20b and 20b' have opposite revolving directions. Alternatively several segments revolving in each case in opposite directions to one another are possible. It must be noted that the worm-like segments do not rotate themselves, but are fixed within the flow-through tubes.

The crank housing gases which enter into the inlet chamber 5 via the opening 3, now flow through the two flow-through tubes 10a, 10b into the calming chamber 6. With this they are firstly set into one rotational direction by way of the worm-like segments 20a', 20b and subsequently are set into an opposite rotational direction by way of the worm-like elements 20a, 20b'. By way of this the oil spray contained in the gas is separated on the wall of the flow-through tubes 10a, 10b and runs out along the wall via the openings 13a, 13b. The separated oil then collects in the oil tank or the calming chamber 6. From there it may be led away via a return valve, via a valve to be opened periodically or also via a siphon. This is not shown in this drawing.

The purified crank housing gases now leave the chamber 6 via the outlet 4.

The plane which is defined by the cylinder head cover and which corresponds to the x-y plane represented in FIG. 1b extends over the cylinder head 2 of the combustion engine. The middle axis of the flow-through tubes 10a, 10b runs inclined at the angle α with respect to this plane. This has the advantage that any separated water runs out by itself from these flow tubes 10a, 10b, even if motor is at a standstill, and thus an icing-up of these flow tubes 10a, 10b is prevented.

The inclination must at the same time be selected such that also when the vehicle has been positioned obliquely, the running-away of water out of the flow tubes 10a, 10b is ensured.

Figure 2:
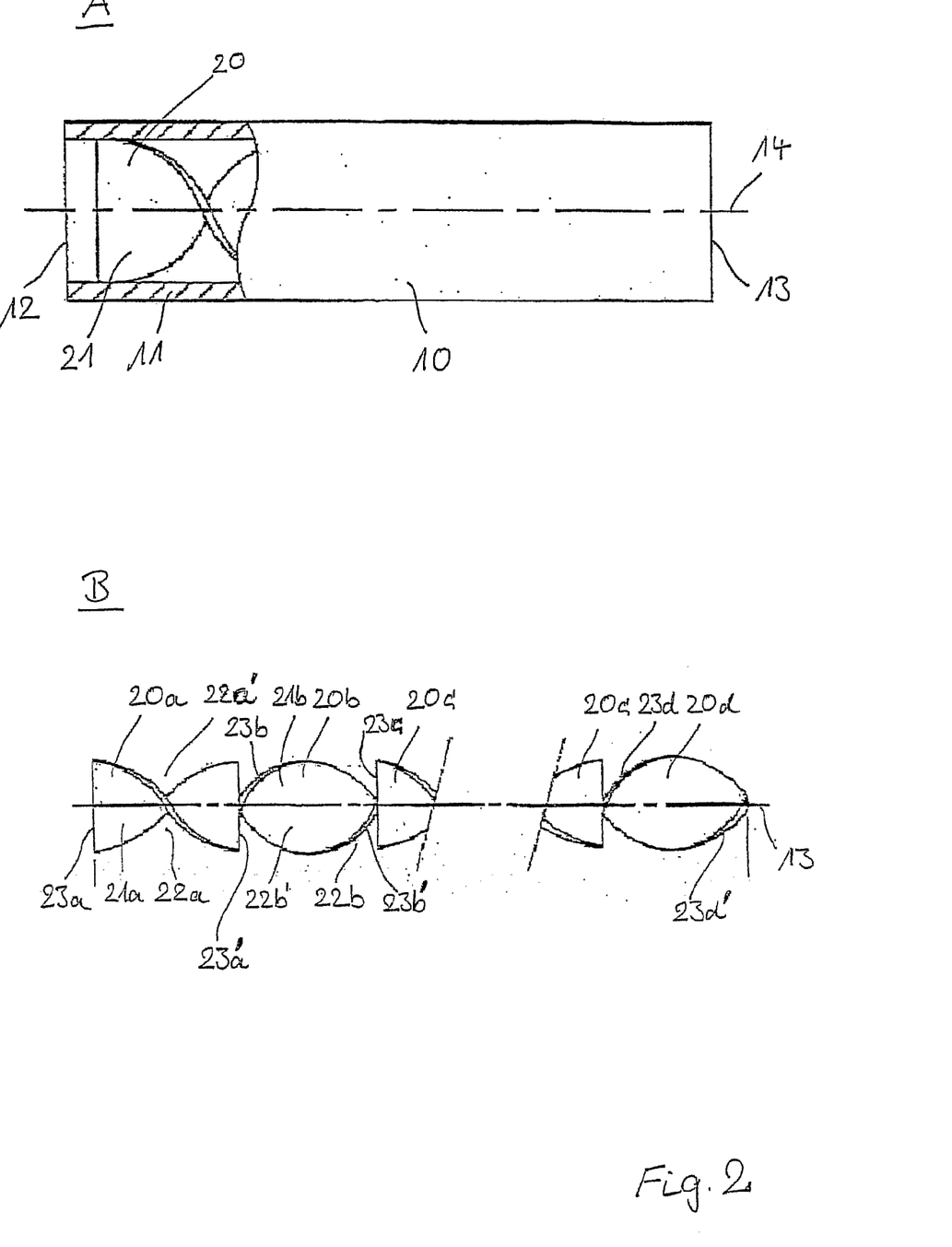
FIG. 2 an oil separator to be inserted therein.

FIG. 2 shows a flow-through tube according to the invention as an oil separator 10 with a wall 11, with an inlet 12 and with an outlet 13.

FIG. 2A now shows the flow-through tube 10 which is cut open in the left part. One may recognise a fast worm-like segment 20 which has thread surfaces 21 twisted about the middle axis 14.

FIG. 2B shows a sequence of several worm-like segments 20a to 20d, which have a different rotational direction.

The segment 20a rotates in the clockwise direction, whilst the segment 20b rotates in the anti-clockwise direction. The segment 20c which is represented partly interrupted is in turn clockwise rotating and the segment 20d anti-clockwise rotating.

Figure 3:
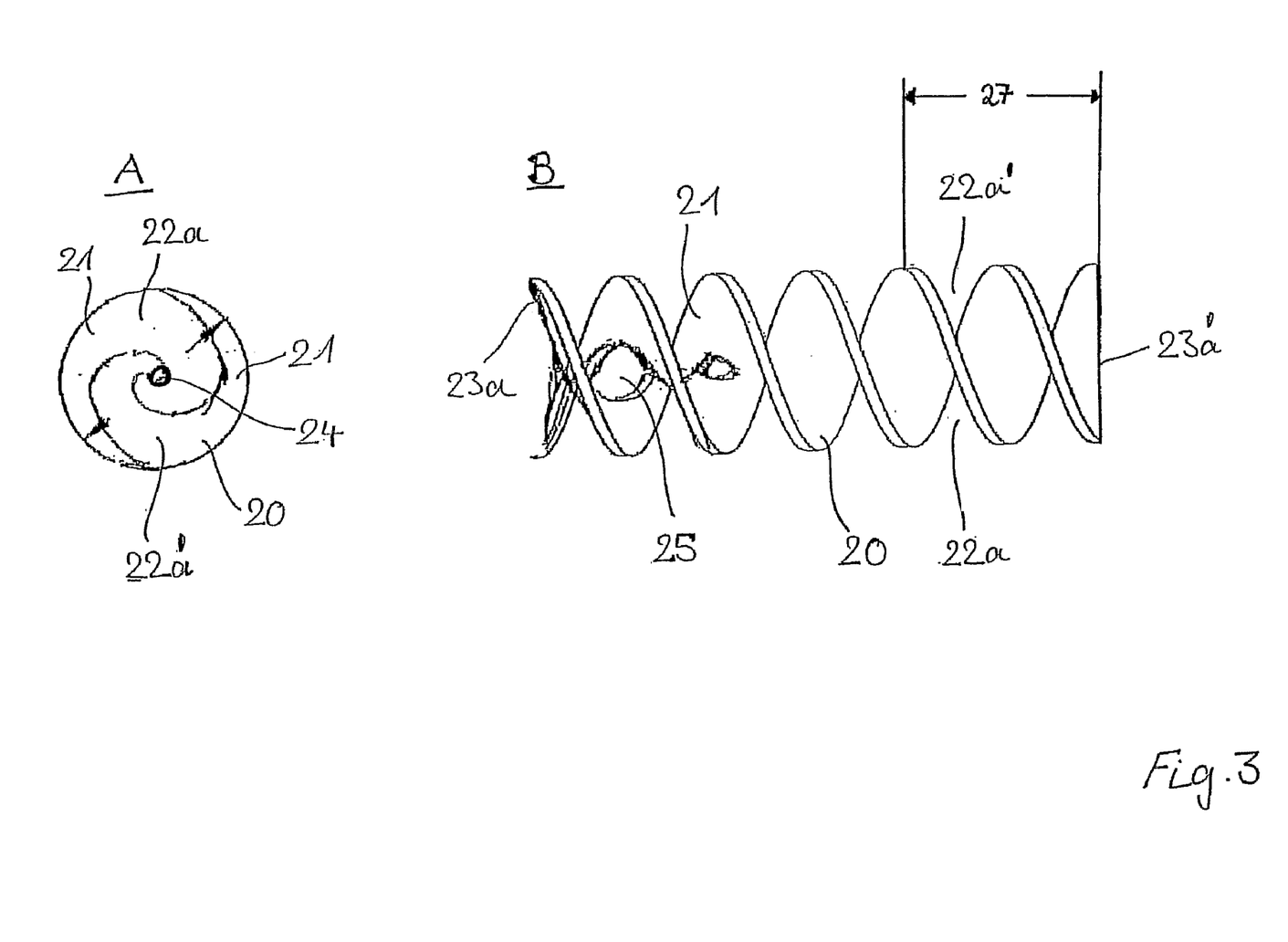
FIGS. 3 to 6 worm-like segments for application in the present invention.

FIG. 3 shows a further segment 21 as may be applied with the present invention. The segment 21 rotates clockwise and has two flow paths or two flights 22a, 22a'. These flow paths in the axial direction are offset to one another (mutually offset) by half a pitch, a complete pitch is indicated with the reference numeral 27.

FIG. 3A shows this worm-like segment which extends over in total three pitches, in cross section. Again the two flights 22a and 22a' are to be recognised, wherein a core 24 is formed in the middle axis of the segment 20. This core, as is to be recognised in FIG. 3B, is removed at the beginning of the segment on the left side. At the same time this tore is removed from the segment in a conically converging shape. This has the effect that the pressure losses at the beginning of the segment are very greatly reduced.

Figure 4:
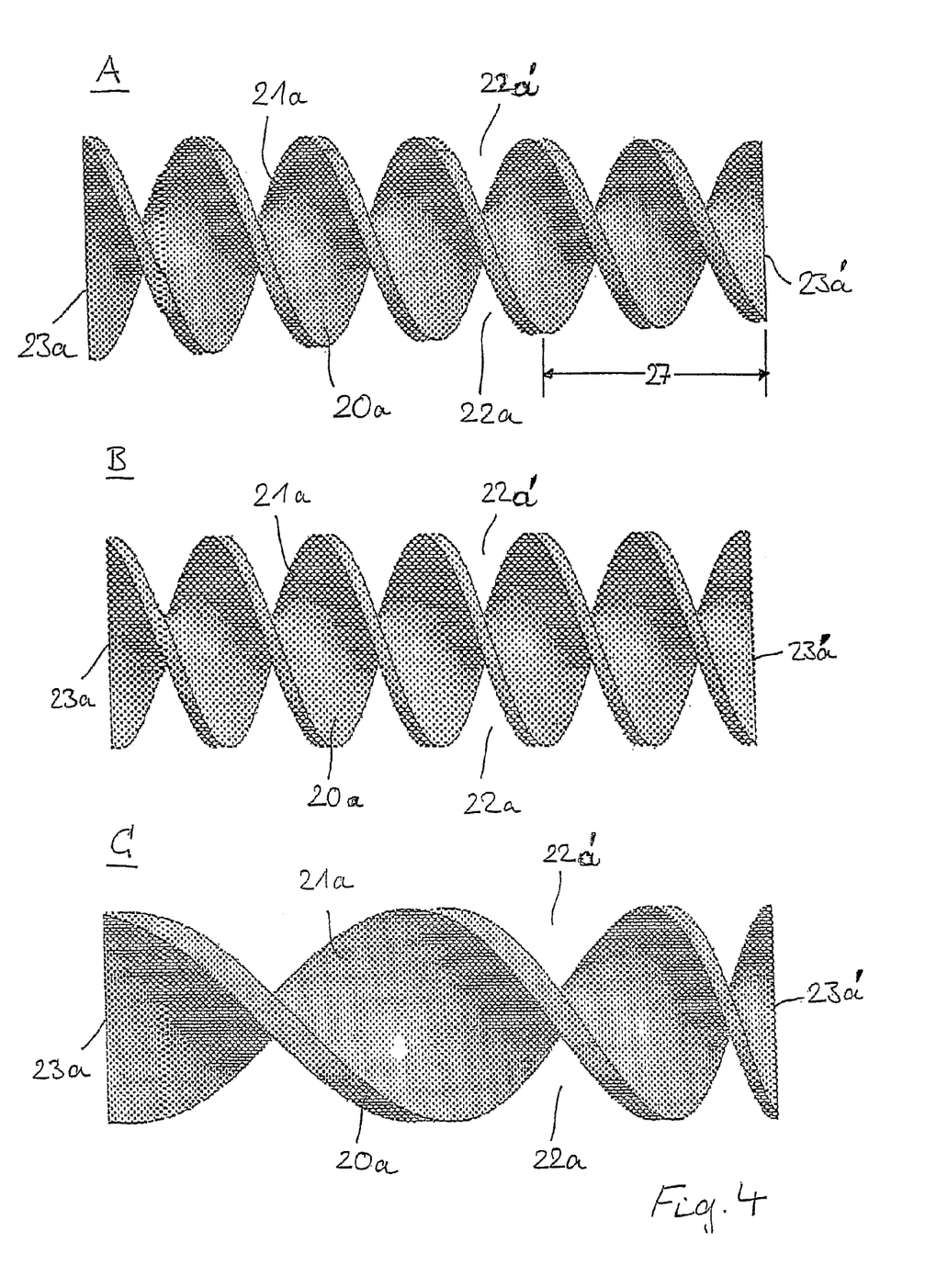

FIG. 4 shows further worm-like segments in the part pictures A, B and C, which may be applied in the present invention. All of these segments rotate clockwise.

In FIG. 4A, the diameter of the segment changes from the edge 23a to the edge 23a' so that such a segment may be applied in a tapering flow-through tube.

The segment in FIG. 4B has a pitch which is uniform over its entire length, and an unchanged diameter.

The segment in FIG. 4C has a pitch which reduces in the course of the rotation from the edge 23a to 23a'. By way of this the total pressure loss in the segment is also reduced.

Figure 5:
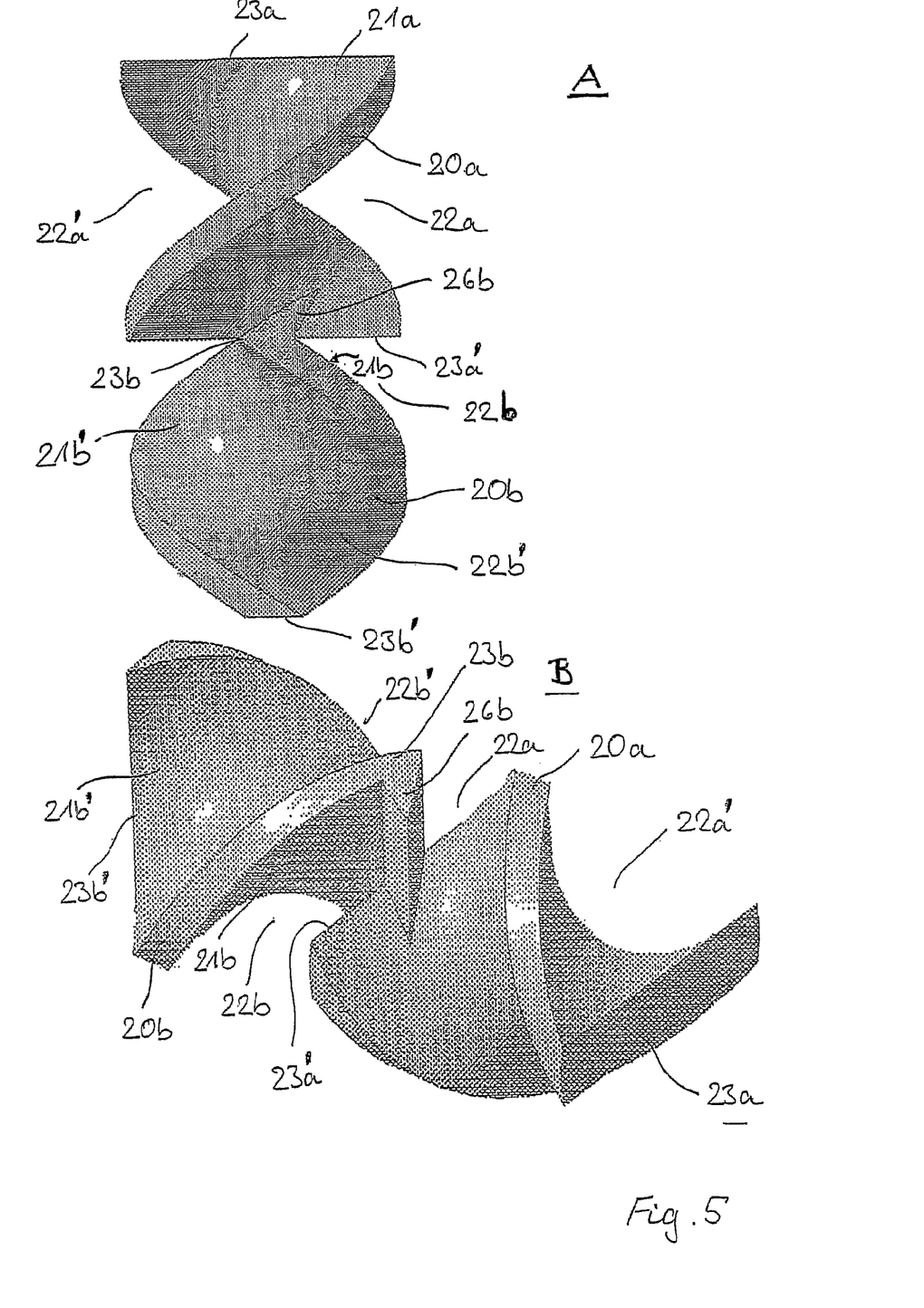

FIG. 5 in two different views in the FIGS. 5A and 5B shows the sequence of two worm-like segments 20a and 20b. Both segments have two flights 22a, 22a' and 22b and 22b'. The segment 20a at the same time rotates clockwise and the segment 20b anti-clockwise. The front edge 23b of the segment 20b at the same time is offset to the rearward edge 23a' of the segment 20a by 90°. By way of this the thread surface 21b projects into the flow path which is formed by the flight 22a. The same applies in a corresponding manner to the flight 22a'.

The thread surface 21b now for the gas which flows through the flight 22a forms a impingement surface which further improves the separation of the oil. In order however to avoid an atomisation at the edge 23b of the oil spray separated on the surface 21b, a flange 26b is attached along the edge 23b opposite to the flow direction of the gas, i.e. in the direction of the flight 22a, said flange as a web or raised part preventing the overflow of the oil in the direction of the edge 23b.

Figure 6:
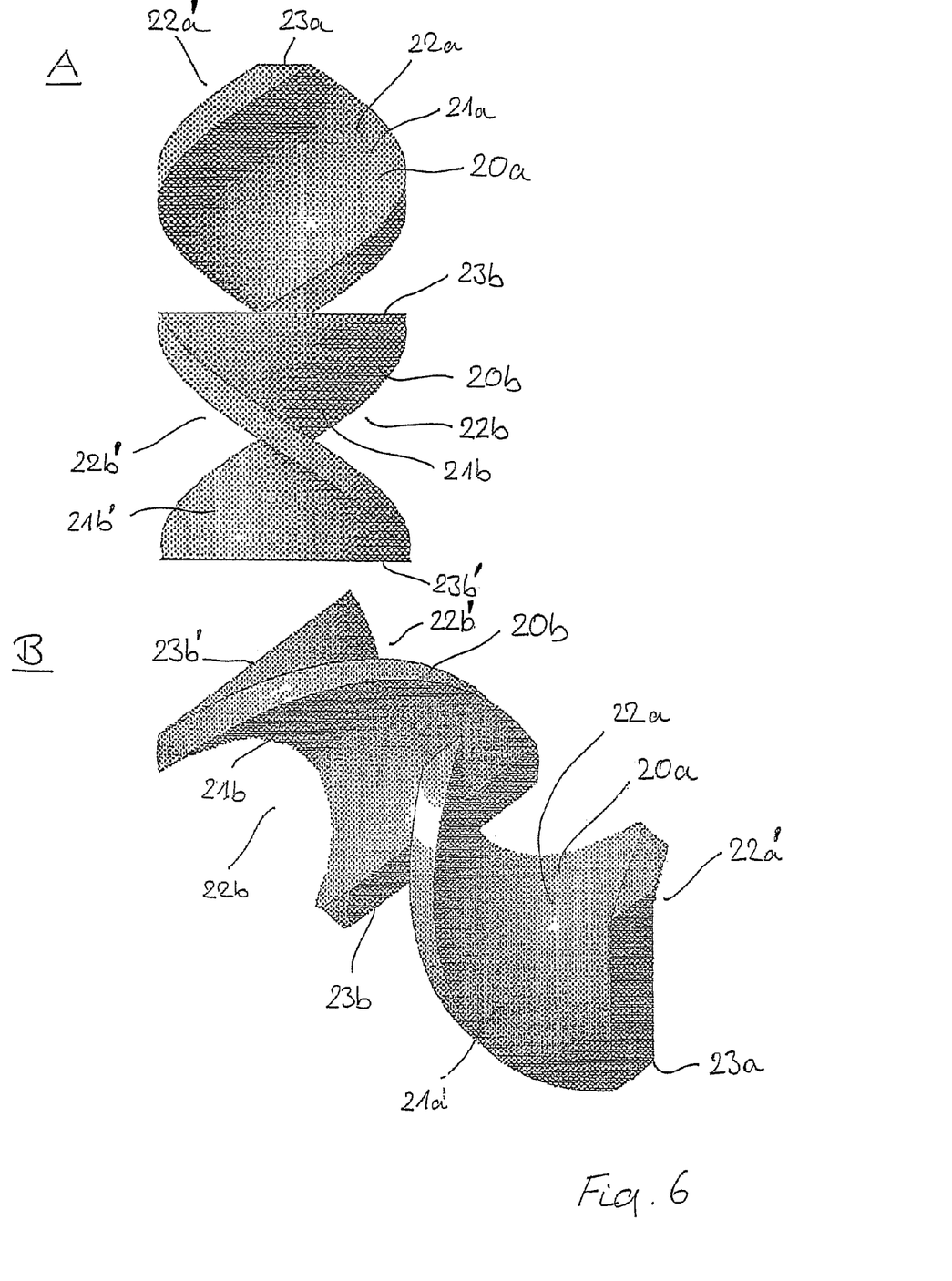

FIG. 6 in a corresponding manner shows two segments which are arranged after one another, wherein in FIG. 5 as well as in FIG. 6, for the part figure A, the flow direction of the gas is to be observed from the top to the bottom, and for the part figure B the flow direction from the bottom right to the top left.

In FIG. 6 again a clockwise rotating segment 20a is followed by an anti-clockwise rotating segment 20b. This embodiment example corresponds completely to that in FIG. 5, however the web 26b is not present. In all further points, this embodiment corresponds to that in FIG. 5.

The invention claimed is:

1. A cylinder head cover for covering a cylinder head of a combustion engine, the cylinder head cover defining a plane adapted to extend over the cylinder head, the cylinder head cover including a housing defining a first chamber and a second chamber and an oil separator providing fluid communication between the first chamber and the second chamber of the housing, the oil separator comprising:
   at least one flow-through tube having an inlet and an outlet, the at least one flow-through tube defining a longitudinal axis that is not perpendicular to the plane defined by the cylinder head cover; and
   at least one spiral segment disposed within the at least one flow-through tube, the at least one spiral segment comprised of thread surfaces that, together with an inner surface of the at least one flow-through tube, define at least one spiral flow path between the inlet and the outlet of the at least one flow-through tube.

2. A cylinder head cover as defined in claim 1, wherein the at least one spiral flow path has a cross section of between 1 mm$^2$ and 800 mm$^2$.

3. A cylinder head cover as defined in claim 1, the oil separator comprising at least two flow-through tubes oriented parallel to one another.

4. A cylinder head cover as defined in claim 1, wherein the longitudinal axis of the at least one flow-through tube is essentially parallel to the plane defined by the cylinder head cover.

5. A cylinder head cover as defined in claim 1, further comprising at least first and second spiral segments aligned axially within the at least one flow-through tube.

6. A cylinder head cover as defined in claim 5, wherein a rotational direction defined by the first spiral segment is generally opposite a rotational direction defined by the second spiral segment.

7. A cylinder head cover as defined in claim 5, wherein the first and second spiral segments are spaced apart from one another along the longitudinal axis of the at least one flow-through tube.

8. A cylinder head cover as defined in claim 5, wherein the first spiral segment defines at least a portion of the at least one spiral flow path, and wherein at least a portion of the second spiral segment projects into the portion of the flow path defined by the first spiral segment.

9. A cylinder head cover as defined in claim 8, wherein at least one edge of the second spiral segment projecting into the spiral flow path defined by the first spiral segment comprises a flange directed opposite to the flow direction of the spiral flow path.

10. A cylinder head cover as defined in claim 1, wherein the at least one flow-through tube comprises a plurality of spiral segments, the plurality of helical segments defining a plurality of flow paths within the at least one flow-through tube.

11. A cylinder head cover as defined in claim 1, wherein the at least one spiral flow path defined by the at least one spiral segment forms an angle of approximately 45 degrees to the longitudinal axis of the at least one flow-through tube.

12. A cylinder head cover as defined in claim 1, wherein the at least one spiral segment has a length and a pitch, and wherein the length is between approximately 0.5 and 2.5 times the pitch.

13. A cylinder head cover as defined in claim 1, wherein the at least one flow-through tube is conically widened toward the inlet or the outlet or both.

14. A cylinder head cover as defined in claim 1, wherein at least one spiral segment has an axial core that is conically thickened towards either end of the axial core.

15. A cylinder head cover as defined in claim 1, wherein the distance between the axis of the at least one spiral segment and an inner face of the at least one flow-through tube becomes smaller in the axial direction.

16. A cylinder head cover as defined in claim 1, wherein the radius of the at least one spiral segment becomes smaller in the axial direction, or the diameter of the at least one flow-through tube becomes smaller in the axial direction, or both.

17. A cylinder head cover as defined in claim 1, wherein at least one channel formed in an inner surface of the at least one flow-through tube.

18. A cylinder head cover as defined in claim 17, wherein the at least one channel is aligned in a generally axial direction.

19. A cylinder head cover as defined in claim 1, wherein at least one channel is in the thread surface of the at least one spiral segment.

20. A cylinder head cover as defined in claim 19, wherein the at least one channel is aligned in a general flow direction of a blow-by gas.

21. A cylinder head cover as defined in claim 1, further comprising at least one web aligned in a generally axial direction, the at least one web being formed on a face of the at least one flow-through tube or on the thread surfaces of the at least one spiral segment.

22. A cylinder head cover as defined in claim 1, wherein the pitch of the at least one spiral segments varies along the length of the spiral segment.

23. A cylinder head cover as defined in claim 1, comprising at least first and second spiral segments disposed within the at least one flow-through tube, wherein the pitch of the first spiral segment differs from the pitch of the second spiral segment.

24. A cylinder head cover as defined in claim 1, wherein the at least one spiral segment is displaced from at least one of the inlet and the outlet of the at least one flow-through tube.

25. A cylinder head cover as defined in claim 1, wherein the flow-through tube is slanted relative to the plane defined by the cylinder head cover such that the inlet is above the outlet when the plane defined by the cylinder head cover is oriented horizontally.

* * * * *